United States Patent [19]

Grosse et al.

[11] Patent Number: 4,834,960

[45] Date of Patent: May 30, 1989

[54] PROCESS FOR PURIFYING PHOSPHOROUS ACID

[75] Inventors: Jürgen Grosse; Günther Schimmel, both of Erftstadt; Bernhard Hofmann, Frankfurt, all of Fed. Rep. of Germany

[73] Assignee: Hoechst Aktiengesellschaft, Frankfurt am Main, Fed. Rep. of Germany

[21] Appl. No.: 182,871

[22] Filed: Apr. 18, 1988

[30] Foreign Application Priority Data

May 2, 1987 [DE] Fed. Rep. of Germany ....... 3714657

[51] Int. Cl.$^4$ ................................. C01B 25/6
[52] U.S. Cl. .................................. 423/316; 423/317; 423/321 R
[58] Field of Search .................... 423/321 R, 316, 317

[56] References Cited

U.S. PATENT DOCUMENTS

| | | | |
|---|---|---|---|
| 2,595,198 | 4/1952 | Lefforge et al. | 423/316 |
| 3,415,624 | 12/1968 | Cremer et al. | 423/316 |
| 3,859,419 | 1/1975 | Cremer et al. | 423/316 |

FOREIGN PATENT DOCUMENTS

| | | |
|---|---|---|
| 2204929 | 1/1976 | Fed. Rep. of Germany . |
| 1417680 | 12/1975 | United Kingdom . |

*Primary Examiner*—Gregory A. Heller

[57] ABSTRACT

The purification of phosphorous acid which is formed in halogenations of hydrocarbon derivatives using phosphorus trihalides is carried out in the context of preparing phosphorous acid in a reaction zone by reacting a mixture of phosphorus trichloride and water which has been finely divided by means of steam at temperatures between 150° and 200° C. in the gas phase. In this process, the liquid reaction product drains into a concentrating evaporation zone which has a downstream first separation zone. Inert gas is introduced to the lower part of the first separation zone. A melt is withdrawn from the first separation zone into a crystallizing zone. The waste gases from the reaction zone are treated with a washing liquid in a second separation zone before being passed into the atmosphere. The washing liquid used is an aqueous solution of never-purified phosphorous acid, which can have been prepurified by hydrolysis and stripping.

13 Claims, No Drawings

PROCESS FOR PURIFYING PHOSPHOROUS ACID

The present invention relates to a process for purifying phosphorous acid which is formed in halogenations of hydrocarbon derivatives with phosphorus trihalides in the context of preparing phosphorous acid by reacting the mixture of phosphorus trichloride and water finely divided by means of steam at temperatures between 150° and 200° C. in the gas phase in a reaction zone, the liquid reaction product draining a concentrating zone which is followed on the downstream side by a first separation zone, into the lower part of which inert gas is introduced and from which a melt is withdrawn into a crystallization zone, the waste gases from the reaction zone being treated with a washing liquid in a second separation zone before being passed into the atmosphere.

From U.S. Pat. No. 3,859,419, it is known that phosphorous acid can be prepared by atomizing phosphorus trichloride and water together with steam and, with intimate mixing, introducing the mixture into a reactor in which the components are reacted with each other in the gas phase at temperatures between 150° and 200° C. The liquid reaction product passes from the reactor into an evaporator in which it is concentrated, the waste gases which are formed reaching a separator which is set up as a reflux column in which they are treated with a washing liquid. The melt leaving the evaporator at the bottom is purged with an inert gas in a downstream stripping column before solidifying in a crystallizer to give phosphorous acid in the form of flakes.

If phosphorous trichloride is used for halogenating hydrocarbon derivatives, a phosphorous acid is formed which is contaminated with organic components and partly condensed and which in this form is not suitable for any further use.

Therefore, the object of the present invention is to describe a process by which the phosphorous acid which is formed in the halogenation of hydrocarbon derivatives using phosphorus trihalides can be purified in a simple manner. This object is achieved according to the invention in the context of the preparation of phosphorous acid by reacting phosphorus trichloride with water in a reaction zone and treating the waste gases leaving the reaction zone in a separation zone with a washing liquid comprising an aqueous solution of never-purified phosphorous acid.

A further alternative embodiment of the process according to the invention can also be such that
(a) the aqueous solution of the never-purified phosphorous acid is prepurified by hydrolysis and stripping;
(b) the contaminated phosphorous acid is mixed with 5 to 80% by weight, preferably 36 to 60% by weight of water, and the mixture is stirred for 0.5 to 5 hours, preferably 1 to 3 hours at temperatures from 50° to 100° C. and is subsequently purged with inert gas for 0.5 to 2; hours;
(c) nitrogen is used as the inert gas;
(d) the hydrolyzed and stripped phosphorous acid is separated off from an oily film floating on top of it;
(e) the washing liquid contains 4 to 90% by weight of $H_3PO_3$;
(f) 0.1 to 0.35 kg/h of washing liquid is used per kg/h of starting phosphorus trichloride.

Using the process according to the invention gives a phosphorous acid which, in terms of its contents of $H_3PO_3$, $H_3PO_4$, chloride, iron and organic components, is essentially identical to prior art phosphorous acid (analysis: 99.3% of $H_3PO_3$; 0.3% of $H_3PO_4$; 7 ppm of chloride; 2 ppm of iron and a maximum of 150 ppm of organic carbon).

EXAMPLE 1 (according to the invention):

Never-purified, partly condensed phosphorous acid (108.5% of $H_3PO_3$; 0.3% of $H_3PO_4$; 0.65% of chloride; 0.48% of organic carbon) formed in the chlorination of carboxylic acids using phosphorus trichloride was stirred with 50% by weight of water at 75° C. for 2 hours and subsequently vigorously purged by passing through nitrogen at the same temperature for 1 hour. Finally, the hydrolyzed phosphorous acid was separated off from a thin oily film floating on top of it by decanting.

The resulting aqueous solution contained 75.5% of $H_3PO_3$; 0.2% of $H_3PO_4$; 0.015% of chloride and 0.2% of organic carbon.

EXAMPLE 2 (according to the invention)

156 kg/h of phosphorus trichloride and 50 l/h of water were fed into a reactor by means of a two-component nozzle, and both components were simultaneously atomized and heated up using steam. The temperature in the reactor during this process varied between 170° and 180° C. The liquid reaction product which drained from the reaction into a concentrating evaporator was kept at 210° C. in the evaporator by means of a heating candle. In the first separator, downstream from the evaporator, the remaining water and the remaining hydrogen chloride were removed from the $H_3PO_3$ melt by introducing nitrogen into the lower part of the first separator. The $H_3PO_3$ melt leaving the first separator was passed into a crystallizer from which it emerged as a flaky material.

The waste gases from the reaction zone were treated in a second separator in a counter-current process with 40 kg/h of the aqueous solution from Example 1 as the washing liquid.

This gives 119 kg/h of a phosphorous acid having 99.3% of $H_3PO_3$; 0.3% of $H_3PO_4$; 9 ppm of chloride; 5 ppm of iron and less than 150 ppm of organic carbon.

EXAMPLE 3 (according to the invention)

Example 2 was repeated except that 53 kg/h of the aqueous solution from Example 1 were used as the washing liquid.

This gave 123 kg/h of a phosphorous acid having 99.3% of $H_3PO_3$; 0.3% of $H_3PO_4$, 8 ppm of chloride; 6 ppm of iron and less than 150 ppm of organic carbon.

EXAMPLE 4 (comparative example)

Example 2 was repeated except that 65 kg/h of the aqueous solution from Example 1 were used as the washing liquid.

Although 126 kg/h of a phosphorous acid having 99.3% of $H_3PO_3$; 0.3% of $H_3PO_4$; 7 ppm of chloride; 6 ppm of iron and less than 150 ppm of organic carbon were obtained there were signs of refluxing in the second separator, causing some of the washing liquid to be driven directly into the downstream HCl washing column.

We claim:

1. A process for purifying phosphorous acid which is formed in halogenations of hydrocarbon derivatives with phosphorus trihalides and which is contaminated with organic components and partly condensed in the context of preparing phosphorous acid, which process comprises reacting a mixture of phosphorus trichloride and water finely divided by means of steam at temperatures between 150° and 200° C. in the gas phase in a reaction zone, draining the liquid reaction product into an evaporation zone which is followed on its downstream side by a first separation zone, into the lower part of which inert gas is introduced and from which a melt is withdrawn into a crystallization zone; and treating the waste gases from the reaction zone prior to their passage into the atmosphere in a second separation zone with a washing liquid comprising an aqueous solution of the phosphorous acid being formed in halogenations of hydrocarbon derivatives with phosphorus trihalides and being prepurified by hydrolysis and stripping.

2. The process as claimed in claim 1, wherein the hydrolyzed and stripped phosphorous acid is separated off from an oily film floating on top of it.

3. The process as claimed in claim 1, wherein the washing liquid contains 4 to 90% by weight of $H_3PO_3$.

4. The process as claimed in claim 1, wherein 0.1 to 0.35 kg/h of washing liquid is used per kg/h of starting phosphorus trichloride.

5. The process as claimed in claim 1, wherein the phosphorous acid being informed in halogenations of hydrocarbon derivatives with phosphorus trihalide is mixed with 5 to 80% by weight of water, and the mixture is stirred for 0.5 to 5 hours at temperatures from 50° to 100° C. and is subsequently purged with inert gas for 0.5 to 2 hours.

6. The process as claimed in claim 5, wherein nitrogen is used as the inert gas.

7. The process as claimed in claim 5, wherein the phosphorous acid is mixed with 36 to 60% by weight of water.

8. The process as claimed in claim 5, wherein the mixture of phosphorous acid and water is stirred for 1 to 3 hours.

9. A process for purifying byproduct phosphorous acid formed as a contaminated byproduct in the halogenation of a hydrocarbon derivative with a phosphorus trihalide and for utilizing said byproduct phosphorous acid in the manufacture of phosphorous acid from water and phosphorus trichloride, said process comprising:
(a) prepurifying the byproduct phosphorous acid by hydrolysis and stripping,
(b) combining the phosphorus trichloride and water and steam in a reaction zone, draining the liquid reaction product into an evaporation zone which is followed on its downstream side by a first separation zone having an upper end and a lower end, in which a melt collects, withdrawing the melt from the lower end of the first separation zone and conveying said melt to a crystallization zone from which the phosphorous acid product is recovered in substantially pure form,
(c) conveying the waste gases from the reaction zone to a second separation zone for treatment of said gases prior to passing them into the atmosphere,
(d) treating the waste gases in said second separation zone with a washing liquid comprising the prepurified byproduct phosphorous acid obtained in said step (a), whereby the yield of phosphorous acid recovered from the crystallization zone is increased without substantially detracting from the purity thereof.

10. The process as claimed in claim 9, wherein the hydrocarbon derivative is a carboxylic acid.

11. The process as claimed in claim 9, wherein said step
(a) includes the step of separating off the hydrolyzed and stripped phosphorous acid from an oily film floating on top of it.

12. The process as claimed in claim 9, wherein the washing liquid contains 4 to 90% by weight of $H_3PO_3$.

13. The process as claimed in claim 9, wherein 0.1 to 0.35 kg/hr of washing liquid is used in said step (d) per kg/hr of starting phosphorus trichloride in said step (b).

* * * * *